(12) United States Patent
Liao (10) Patent No.: US 8,744,849 B2
(45) Date of Patent: Jun. 3, 2014

(54) MICROPHONE-ARRAY-BASED SPEECH RECOGNITION SYSTEM AND METHOD

(75) Inventor: Hsien-Cheng Liao, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 364 days.

(21) Appl. No.: 13/271,715

(22) Filed: Oct. 12, 2011

(65) Prior Publication Data

US 2013/0030803 A1    Jan. 31, 2013

(30) Foreign Application Priority Data

Jul. 26, 2011 (TW) .............................. 100126376 A (51) Int. Cl.
*G10L 15/06* (2013.01)

(52) U.S. Cl.
USPC ........ 704/243; 704/240; 704/256.2; 704/239; 704/233

(58) Field of Classification Search
USPC .............. 704/240, 236, 251, 256, 256.2, 239, 704/243, 233
See application file for complete search history.

(56) References Cited

U.S. PATENT DOCUMENTS

| | | | |
|---|---|---|---|
| 6,002,776 A | 12/1999 | Bhadkamkar et al. | |
| 6,738,481 B2 | 5/2004 | Krasny et al. | |
| 7,103,541 B2 | 9/2006 | Attias et al. | |
| 7,263,485 B2 * | 8/2007 | Wark | 704/240 |
| 7,426,464 B2 | 9/2008 | Hui et al. | |
| 7,523,034 B2 * | 4/2009 | Deligne et al. | 704/251 |
| 7,533,015 B2 | 5/2009 | Takiguchi et al. | |
| 7,664,643 B2 * | 2/2010 | Gopinath et al. | 704/256 |
| 7,895,038 B2 | 2/2011 | Nishimura et al. | |
| 8,234,111 B2 * | 7/2012 | Lloyd et al. | 704/233 |
| 8,515,758 B2 * | 8/2013 | Huo | 704/256.2 |
| 2004/0019483 A1 * | 1/2004 | Deng et al. | 704/239 |
| 2005/0114135 A1 * | 5/2005 | Kemp et al. | 704/256 |
| 2005/0246165 A1 * | 11/2005 | Pettinelli et al. | 704/207 |
| 2008/0010065 A1 * | 1/2008 | Bratt et al. | 704/246 |

(Continued)

FOREIGN PATENT DOCUMENTS

| | | |
|---|---|---|
| CN | 101192411 | 6/2008 |
| CN | 101206857 A | 6/2008 |

(Continued)

OTHER PUBLICATIONS

Harding, S., Barker, J. and Brown, G, "Mask estimation for missing data speech recognition based on statistics of binaural interaction", IEEE Trans. Audio Speech Lang. Process., 14:58-67, 2006.

(Continued)

*Primary Examiner* — Vijay B Chawan
(74) *Attorney, Agent, or Firm* — Rabin & Berdo, P.C.

(57) ABSTRACT

A microphone-array-based speech recognition system combines a noise cancelling technique for cancelling noise of input speech signals from an array of microphones, according to at least an inputted threshold. The system receives noise-cancelled speech signals outputted by a noise masking module through at least a speech model and at least a filler model, then computes a confidence measure score with the at least a speech model and the at least a filler model for each threshold and each noise-cancelled speech signal, and adjusts the threshold to continue the noise cancelling for achieving a maximum confidence measure score, thereby outputting a speech recognition result related to the maximum confidence measure score.

20 Claims, 12 Drawing Sheets

(56) References Cited

U.S. PATENT DOCUMENTS

| | | | |
|---|---|---|---|
| 2008/0052074 A1* | 2/2008 | Gopinath et al. | 704/256 |
| 2010/0138215 A1 | 6/2010 | Williams | |
| 2011/0103613 A1* | 5/2011 | Van Der Werf et al. | 381/93 |
| 2011/0144986 A1 | 6/2011 | Yu et al. | |
| 2011/0257976 A1* | 10/2011 | Huo | 704/256.1 |
| 2012/0197638 A1* | 8/2012 | Li et al. | 704/226 |
| 2012/0259631 A1* | 10/2012 | Lloyd et al. | 704/233 |

FOREIGN PATENT DOCUMENTS

| | | |
|---|---|---|
| CN | 100535992 | 9/2009 |
| CN | 101668243 A | 3/2010 |
| CN | 101763855 A | 6/2010 |
| CN | 101779476 | 7/2010 |
| CN | 102111697 A | 6/2011 |
| TW | 200304119 | 9/2003 |
| TW | 200926150 | 6/2009 |
| TW | 201030733 | 8/2010 |
| TW | 201110108 | 3/2011 |

OTHER PUBLICATIONS

Srinivasan, S., Roman, N. and Wang, D., "Binary and ratio time-frequency masks for robust speech recognition", Speech Communication, 48:1486-1501, 2006.

Kim, C., Stern, R.M., Eom, K. and Lee, J., "Automatic selection of thresholds for signal separation algorithms based on interaural delay", In Interspeech-2010, pp. 729-732, 2010.

Shi, G, Aarabi, P. and Jiang, H., "Phase-Based Dual-Microphone Speech Enhancement Using a Prior Speech Model", IEEE Trans. Audio Speech Lang. Process., 15:109-118, 2007.

Taiwan Patent Office, Office Action, Patent Application Serial No. TW100126376, Oct. 1, 2013, Taiwan.

China Patent Office, Office Action, Patent Application Serial No. CN201110242054.5, Mar. 5, 2014, China.

* cited by examiner

| method SNR | single microphone recognition rate | EM algorithm | sequential search method (50 speech model) | sequential search method (1 speech model) |
|---|---|---|---|---|
| 0dB | 8.96 | 89.76 | 89.76 | 93.24 |
| 6dB | 61.79 | 93.60 | 95.25 | 94.33 |
| 12dB | 90.31 | 96.34 | 97.62 | 95.98 |
| 18dB | 95.80 | 95.95 | 98.17 | 95.43 |

FIG. 11B

| method SNR | single microphone recognition rate | EM algorithm | sequential search method (50 speech model) | sequential search method (1 speech model) |
|---|---|---|---|---|
| 0dB | 20.29 | 92.32 | 91.77 | 92.50 |
| 6dB | 71.85 | 95.80 | 96.34 | 95.25 |
| 12dB | 92.14 | 95.61 | 97.26 | 97.44 |
| 18dB | 96.53 | 97.26 | 97.26 | 96.71 |

FIG. 12

MICROPHONE-ARRAY-BASED SPEECH RECOGNITION SYSTEM AND METHOD

CROSS-REFERENCE TO RELATED APPLICATION

The present application is based on, and claims priority from, Taiwan Application No. 100126376, filed Jul. 26, 2011, the disclosure of which is hereby incorporated by reference herein in its entirety.

TECHNICAL FIELD

The present disclosure generally relates to a microphone-array-based speech recognition system and method.

BACKGROUND

Recently users of mobile devices such as flat panel computer, cellular phone increase dramatically, vehicle electronics and robotics are also developing rapidly. The speech applications of these areas may be seen growing in near future. Google's Nexus One and Motorola's Droid introduce active noise cancellation (ANC) technology to the mobile phone market, improve the input of speech applications, and make the back-end speech recognition or its application performing better, so that users may get better experience. In recent years, more mobile phone manufacturers are also actively involved in research of noise cancellation technology.

Common robust speech recognition technology includes two types. One type is the two-stage robust speech recognition technology, such kind of technology first enhances speech signal, and then transmits the enhanced signal to a speech recognition device for recognition. For example, uses two adaptive filters or combined algorithm of pre-trained speech and noise models to adjust an adaptive filter, enhances speech signal, and transmits the enhanced-signal to the speech recognition device. Another type uses a speech model as the basis for adaptive filter adjustment, but does not consider the information of noise interference. The criteria of this speech signal enhancement is based on maximum likelihood, that is, the better the enhanced speech signal more similar to the speech model.

Figure 1:
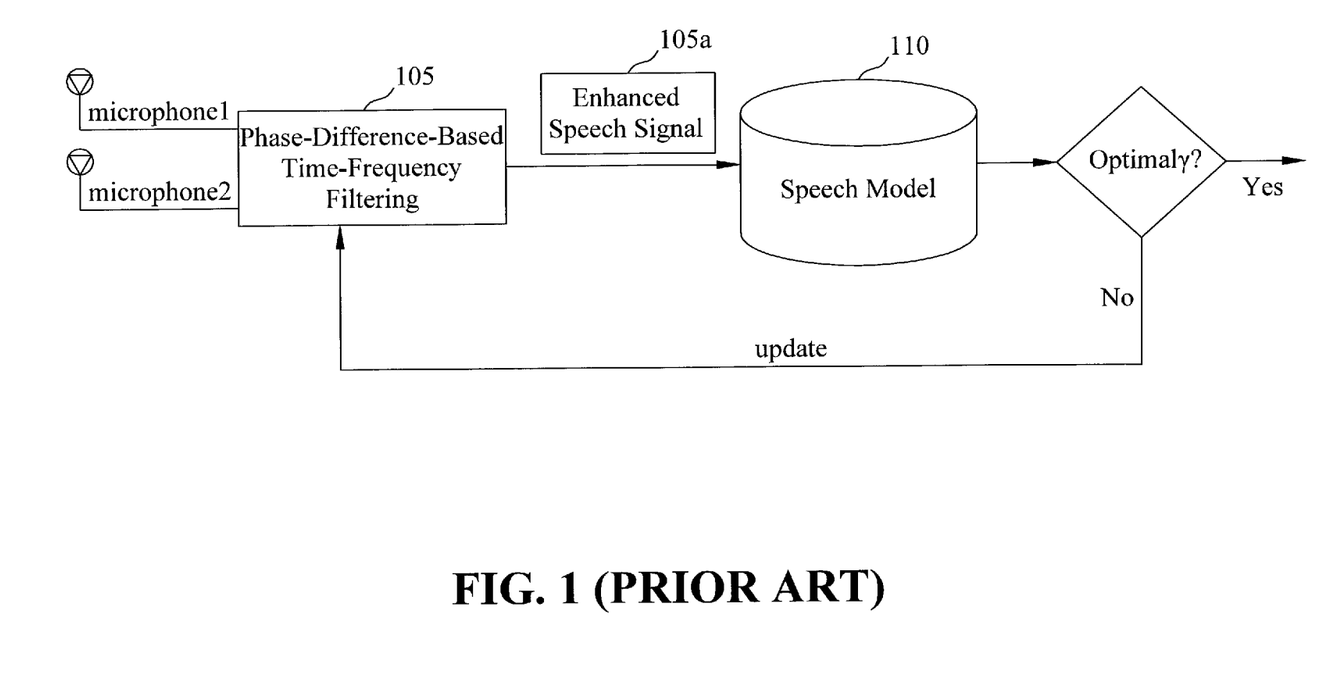
FIG. 1 is an exemplary schematic diagram of filter parameter adjustment process in a dual-microphone-based speech enhancement technology.

FIG. 1 illustrates an exemplary schematic diagram of filter parameter adjustment process in a dual-microphone-based speech enhancement technology. The speech enhancement technology uses a re-recorded and filtered corpus to train a speech model 110, then uses the criterion of maximized similarity to adjust the noise filtering parameter y, that is, the criteria of the speech enhancement technique is determined by the better the enhanced speech signal 105a from the phase-difference-based time-frequency filtering 105 more similar to the speech model 110. The corpus for the training of the speech model 110 is needed to be re-recorded and filtered, and no noise information is considered, thus the setting for test and training conditions may be mismatched.

Dual microphone or microphone-array noise cancellation technology has a good anti-noise effect. However, in different usage environments, the ability of anti-noise is not the same. It is worth for research and development work on adjusting parameters of microphone array to increase speech recognition accuracy and provide better user experience.

SUMMARY

The present disclosure generally relates to a microphone-array-based speech recognition system and method.

In an exemplary embodiment, the disclosed relates to a microphone-array-based speech recognition system. This system combines a noise masking module for cancelling noise of input speech signals from an array of microphones, according to an inputted threshold. The system comprises at least a speech model and at least a filler model to receive respectively a noise-cancelled speech signals outputted from the noise masking module, a confidence measure score computation module, and a threshold adjustment module. The confidence measure score computation module computes a confidence measure score with the at least a speech model and the at least a filler model of the noise-cancelled speech signal. The threshold adjustment module adjusts the threshold and provides it to the noise masking module to continue the noise cancelling for achieving a maximum confidence measure score through confidence measure score computation module, thereby outputting a speech recognition result related to the maximum confidence measure score.

In another exemplary embodiment, the disclosed relates to a microphone-array-based speech recognition system. The system combines a noise masking module to process noise cancelling of input speech signals from an array of microphones, according to each of a plurality of inputted thresholds within a predetermined range. The system comprises at least a speech model and at least a filler model to receive respectively a noise-cancelled speech signal outputted form the noise masking module, a confidence measure score computation module, and a threshold adjustment module. The confidence measure score computation module computes a confidence measure score with the at least a speech model and the at least a filler model for each given threshold within the predetermined range and the noise-cancelled speech signal. The maximum confidence measure score computation module determines a maximum confidence measure score from all confidence measure scores computed by the confidence measure score computation module and finds a threshold corresponding to the maximum confidence measure score among all the computed confidence measure scores, and outputs a speech recognition result.

Yet in another exemplary embodiment, the disclosed relates to a microphone-array-based speech recognition method. This method is implemented by a computer system, and may comprise following acts executed by the computer system: performing noise cancelling of input speech signals from an array of microphones, according to at least an inputted threshold, and transmits a noise-cancelled speech signal to at least a speech model and at least a filler model respectively, using at least a processor to compute a corresponding confidence measure score based on score information obtained by each of the at least a speech model and score obtained by each of the at least a filler model, and finds a threshold corresponding to the maximum confidence measure score among all the computed corresponding confidence measure scores, and outputs a speech recognition result.

The foregoing and other features, aspects and advantages of the exemplary embodiments will become better understood from a careful reading of a detailed description provided herein below with appropriate reference to the accompanying drawings.

DETAILED DESCRIPTION OF DISCLOSED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In accordance with the exemplary embodiments, a microphone-array-based speech recognition system and method adjust the parameter of noise masking to suppress spectrum portion of noise interference in the speech feature vector by using the maximum confidence measure score computed with at least a speech model and at least a filler model, in order to improve speech recognition rate. The exemplary embodiments may provide implementation for different noisy environments (such as in driving), adjust parameters of the noise masking to cope with speech applications in physical environment. The exemplary embodiments combine noise masking with speech recognition, and use the existing speech models, without re-recording or re-training speech models, to provide better speech interface and user experience for human-computer interaction in a noisy environment.

In the exemplary embodiments, at least a speech model $\Lambda_{SP}$ and at least a filler model $\Lambda_F$ are employed, and a confidence measure score CM is computed according to the following formula:

$$CM = [\log P(C(\tau)|\Lambda_{SP}) - \log P(C(\tau)|\Lambda_F)] \quad (1)$$

Wherein $C(\tau)$ is the feature vector obtained through noise masking with a noise masking threshold $\tau$ for each audio frame generated by a microphone array, and P is a conditional probability function.

Figure 2A:
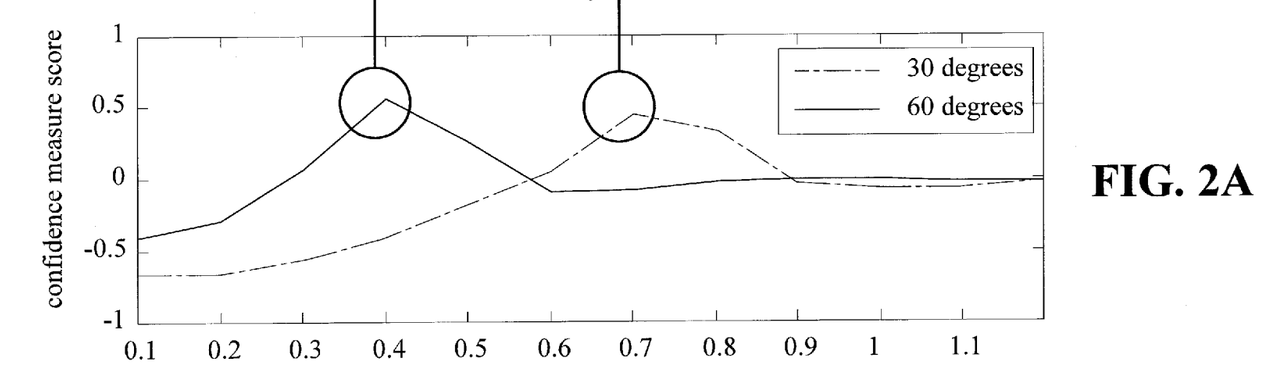
FIG. 2A is a schematic view illustrating the relationship between a noise masking threshold and a confidence measure score, according to an exemplary embodiment.
Figure 2B:
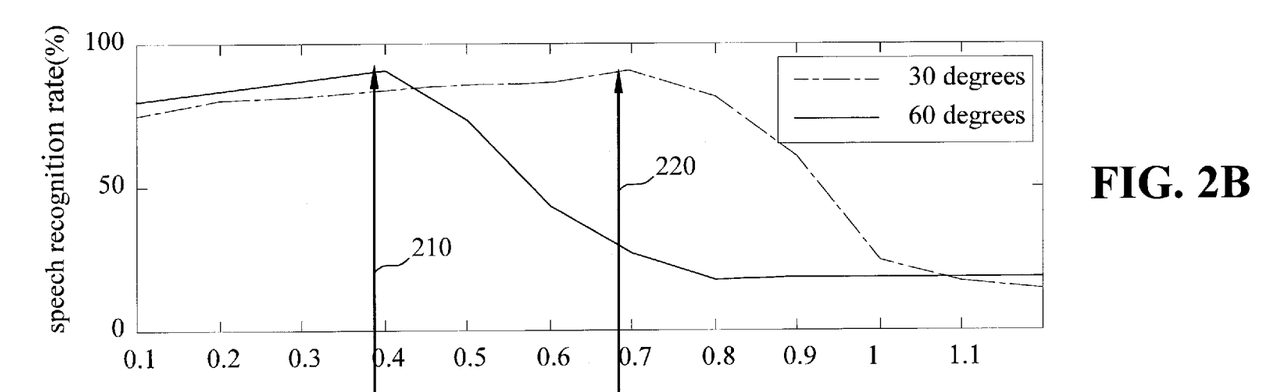
FIG. 2B is a schematic view illustrating the relationship between a noise masking threshold and a speech recognition rate, according to an exemplary embodiment.

In the exemplary embodiments, it may adjust the parameter of the noise masking, i.e., the noise masking threshold $\tau$, through a threshold adjustment module. The threshold adjustment module may adjust the parameter of the noise masking for different angles or different energies of noises. The exemplary embodiments may also confirm when the maximum confidence measure score is achieved, the resulting recognition rate is the highest. In the examples of FIGS. 2A and 2B, both use the microphone array corpus with noises at 30 degrees and 60 degrees under 0 dB SNR for testing, wherein the dashed line represents the test result with the noise at 30 degrees, and the real line represents the test results with the noise at 60 degrees. FIG. 2A shows a schematic view illustrating the relationship between noise masking thresholds and speech recognition rates, according to an exemplary embodiment. In FIG. 2A, the horizontal axis represents the noise masking threshold $\tau$, and the vertical axis represents the confidence measure score CM computed from the formula (1). In FIG. 2B, the horizontal axis represents the noise masking threshold $\tau$, and the vertical axis represents the speech recognition rate.

From the testing results of FIGS. 2A and 2B, it may be seen that each maximum confidence measure score at 30 degrees or 60 degrees in FIG. 2A corresponds to the highest speech recognition, respectively, shown as arrows 210 and 220. Arrow 210 refers to noise at 60 degrees, the maximum confidence measure score corresponds to the highest speech recognition rates; and arrow 220 refers to noise at 30 degrees, the maximum confidence measure score corresponds to the highest speech recognition rates. Therefore, the exemplary embodiments may use linear search, or expectation-maximization (EM) algorithm, etc., to estimate the threshold $\tau_{CM}$ that maximizes confidence measure score. The threshold $\tau_{CM}$ may be expressed by the following formula:

$$\tau_{CM} = \underset{\tau}{\operatorname{argmax}}[\log P(C(\tau)|\Lambda_{SP}) - \log P(C(\tau)|\Lambda_F)] \quad (2)$$

Wherein $C(\tau)$ represents the feature vector obtained through noise masking with noise masking threshold $\tau$ for each audio frame, $\Lambda_{SP}$ and $\Lambda_F$ represent respectively a set of speech model parameters and a set of filler model parameters, P is a conditional probability distribution. In other words, the exemplary embodiments may provide an optimal threshold setting for the noise according to the threshold $\tau_{CM}$ computed in equation (2).

In order to distinguish the speech signal and the noise signal to be cancelled by the microphone array, the exemplary embodiments may closely combine many existing anti-noise technologies, such as phase error time-frequency filtering, delay and sum beamformer, Fourier spectral subtraction, wavelet spectral subtraction, and other technologies for maximizing confidence measure score computed with at least a speech model and at least a filler model, to suppress spectrum part of the noise interference in the speech feature vector, and to increase speech recognition rate.

In other words, the exemplary embodiments may take the noise masking of the microphone-array-based system as basis for selecting reliable spectrum components of the speech feature parameter. For example, the speech feature parameters may be computed from the human auditory characteristics, such as Mel-frequency cepstral coefficients (MFCCs), linear prediction coefficients (LPCs), etc. The exemplary embodiments may adjust the speech feature vector in different directions and energies of the noise interference to improve speech recognition rate, and take the confidence measure score as speech recognition performance indicator to estimate an optimal noise masking threshold $\tau$. The existing technologies such as Mel-Frequency cepstral coefficients and anti-noise technologies are not repeated here.

Figure 3:
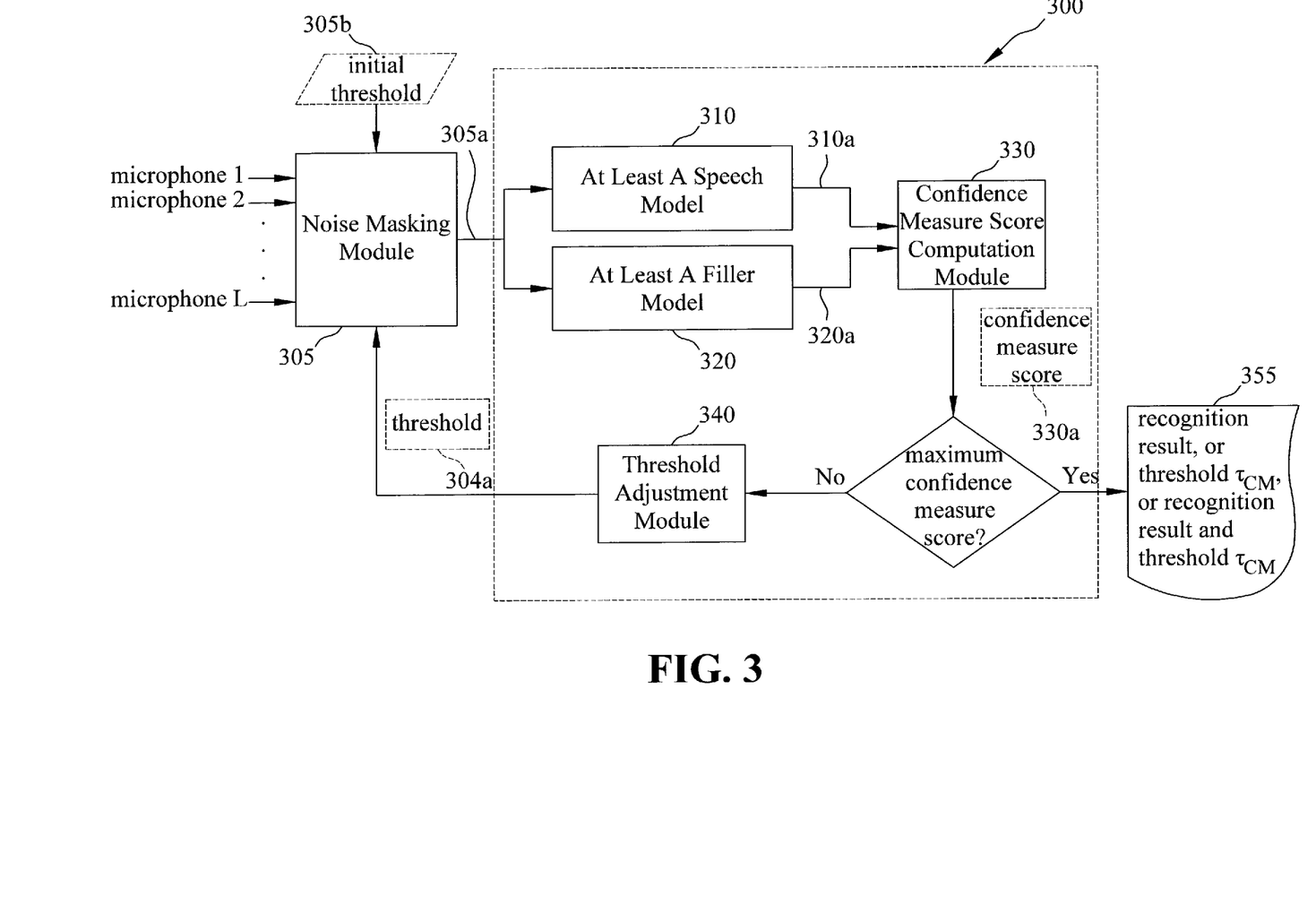
FIG. 3 is a block diagram of a microphone array-based speech recognition system, according to an exemplary embodiment.

FIG. 3 illustrates a block diagram of a microphone-array-based speech recognition system, according to an exemplary embodiment. In FIG. 3, the speech recognition system 300 comprises at least a speech model 310, at least a filler model 320, a confidence measure score computation module 330, and a threshold adjustment module 340. The at least a speech model 310, the at least a filler model 320, the confidence measure score computation module 330, and the threshold adjustment module 340 may be implemented by using hardware description language (such as Verilog or VHDL) for circuit design, do integration and layout, and then program to a field programmable gate array (FPGA).

The circuit design with the hardware description language may be achieved in many ways. For example, the professional manufacturer of integrated circuits may realize implementation with application-specific integrated circuits (ASIC) or customer-design integrated circuits. In other words, the speech recognition system 300 may comprise at least an integrated circuit to implement at least a speech model 310, at least a filler model 320, the confidence measure score computation module 330, and the threshold adjustment module 340. In another instance, speech recognition system 300 may comprise at least a processor to complete functional implementation of at least a speech model 310, at least a filler model 320, the confidence measure score computation module 330, and the threshold adjustment module 340.

As shown in FIG. 3, the speech recognition system 300 combines with a noise masking module 305. The noise masking module 305 proceeds noise cancelling according to a threshold 304a from the threshold adjustment module 340 for the inputted speech from a microphone array (marked as microphone 1, microphone 2, . . . , microphone L, L is an integer greater than 1), and transmits a noise-cancelled speech signal 305a to at least a speech model 310 and at least a filler model 320 respectively. Speech recognition system 300 compares the similarity of the noise-cancelled speech signal 305a with each model of at least a speech model 310 and obtains a score for each model; and compares the similarity of the noise-cancelled speech signal 305a with at least a filler model 320 which is a background model and obtains a score 320a for the filler model. And the score 310a for at least a speech model 310 and the score 320a for at least a filler model 320 are further provided to the confidence measure score computation module 330.

In other words, for a noise-cancelled speech signal and the threshold, the confidence measure score computation module 330 computes a confidence measure score through at least a speech model 310 and at least a filler model 320, and the threshold adjustment module 340 adjusts the threshold and provides the adjusted threshold to the noise masking module 305 to continue noise cancelling for achieving a maximum confidence measure score through confidence measure score computation module 330, thereby outputting a speech recognition result related to the maximum confidence measure score.

In FIG. 3 when the speech recognition system 300 starts to operate, there will be an initial threshold 305b provided to the noise masking module 305 to perform noise cancelling and then transmit a noise-cancelled speech signal 305a to at least a speech model 310 and at least a filler model 320, respectively, such as hidden Markov models (HMM) or Gaussian mixture model (GMM). The at least a filler model 320 may be regarded as at least a non-specific (background) speech model, which may be used to compare with at least a speech model 310. One exemplary implementation of the at least a filler model 320 may use the same corpus as the speech model training, divide all the corpus into a number of sound frame, obtain the feature vector for each frame, and take all the frames as the same model for model training to obtain model parameters.

The exemplary embodiments uses the confidence measure score computation module 330 to compute a confidence measure score 330a according to the score information 310a obtained from each of at least a speech model 310 and the score 320a obtained from each of at least a filler model 320. For example, this may be performed by subtracting the score of at least a filler model 320 from a score function of at least a speech model 310 to get the difference as the outputted confidence measure score.

When the confidence measure score 330a outputted from the confidence measure score computation module 330 does not achieve the maximum, as shown in the exemplary embodiment of FIG. 3, it may adjust a threshold 304a through the threshold adjustment module 340 and output to a noise masking module 305, to maximize the confidence measure score computed by the confidence measure score computation module 330. In order to obtain the threshold that maximizes the confidence measure score, the threshold adjustment module 340 in the exemplary embodiment may use such as expectation-maximization (EM) algorithm, etc., to estimate the threshold $\tau_{CM}$ that maximizes the confidence measure score. When the confidence measure score 330a outputted from the confidence measure score computation module 330 is maximized, the speech recognition system 300 outputs the information of speech recognition result that maximizes the confidence measure score, shown as label 355, which is the recognition result, or the threshold $\tau_{CM}$ that maximizes the confidence measure score, or the recognition result and the threshold $\tau_{CM}$.

Accordingly, the speech recognition system 300 with anti-noise microphone array technology is able to adjust the noise masking parameters for the noise interference with position at different angles or with different energy levels. The speech recognition system 300 takes the confidence measure score as the speech recognition performance indicator, to estimate the optimal noise masking threshold.

Figure 4:
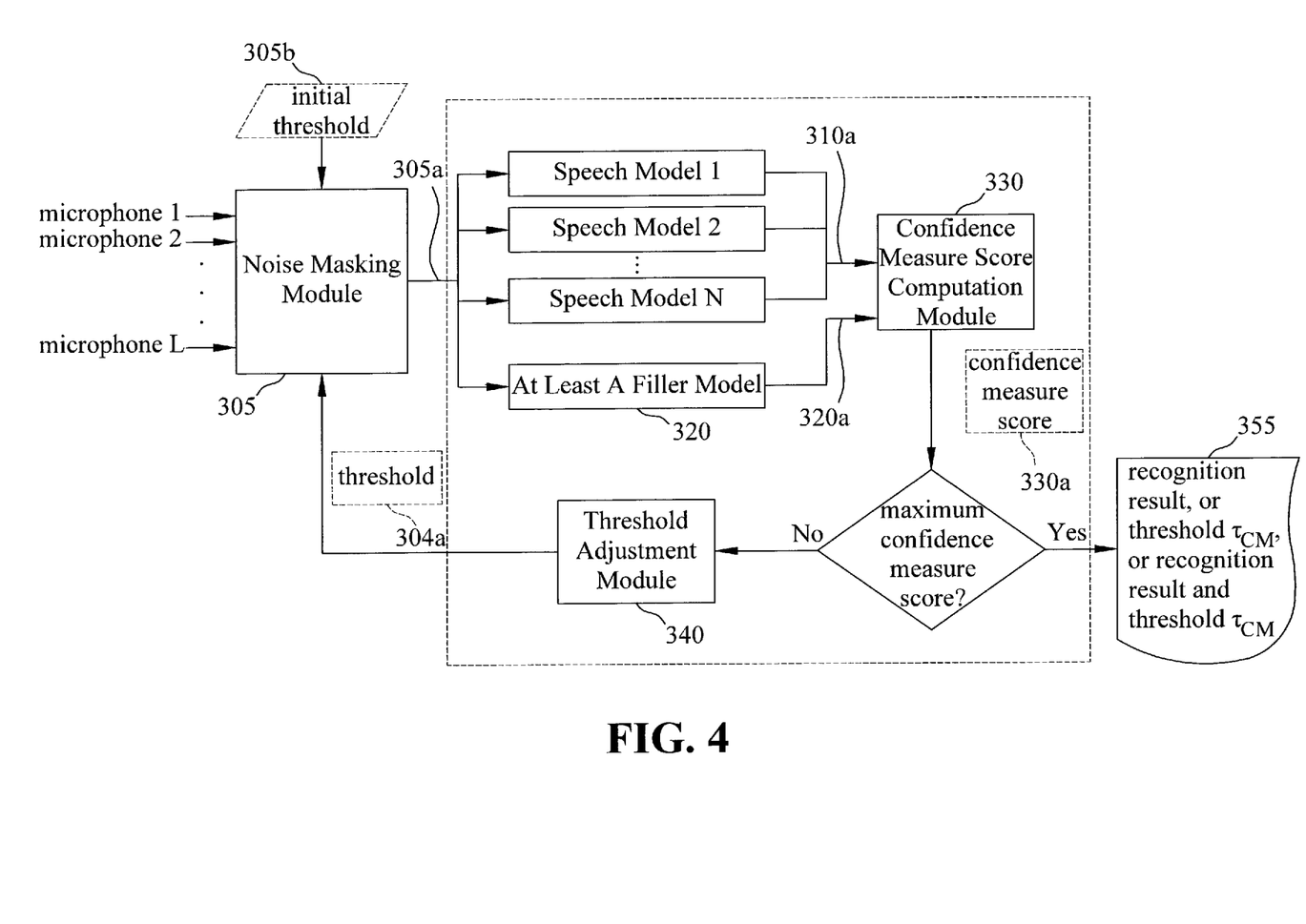
FIG. 4 is a block diagram illustrating an implementation of a function of scores obtained from each of the at least a speech model in FIG. 3, according to an exemplary embodiment.

The score function of at least a speech model 310 may be designed with different ways. For example, in the exemplar of FIG. 4, the at least a speech model may includes N speech models, denoted as speech model 1~speech model N, N is an integer greater than 1. In one instance, the threshold adjustment module 340 may use such as expectation-maximization (EM) algorithm to find the threshold $\tau_{CM}$ corresponding to the maximum confidence measure score, for example, may take the maximum of the score Top1 for each speech model among speech model 1~speech model N. The following formula is used to represent the threshold $\tau_{CM}$ of this case:

$$\tau_{CM} = \underset{\tau}{\operatorname{argmax}}[\log P(C(\tau)|\Lambda_{Top1}) - \log P(C(\tau)|\Lambda_F)]$$

In another instance, the threshold adjustment module 340 may use such as expectation-maximization (EM) algorithm to take M highest scores of M speech models among speech model 1~speech model N and give each of the M highest scores different weights to find the threshold $\tau_{CM}$ corresponding to the maximum confidence measure score, in order to increase robustness. The following formula is used to represent the threshold $\tau_{CM}$ of this case:

$$\tau_{CM} = \underset{\tau}{\operatorname{argmax}}\left[\frac{(\omega_1 \log P(C(\tau)|\Lambda_{Top1}) + \omega_2 \log P(C(\tau)|\Lambda_{Top2}) + L + \omega_M \log P(C(\tau)|\Lambda_{TopM}))}{(\omega_1 + \omega_2 + L + \omega_M)} - \log P(C(\tau)|\Lambda_F)\right]$$

Wherein $\omega_1 \sim \omega_M$ is the given different weights, 1<M<N.

Figure 5:
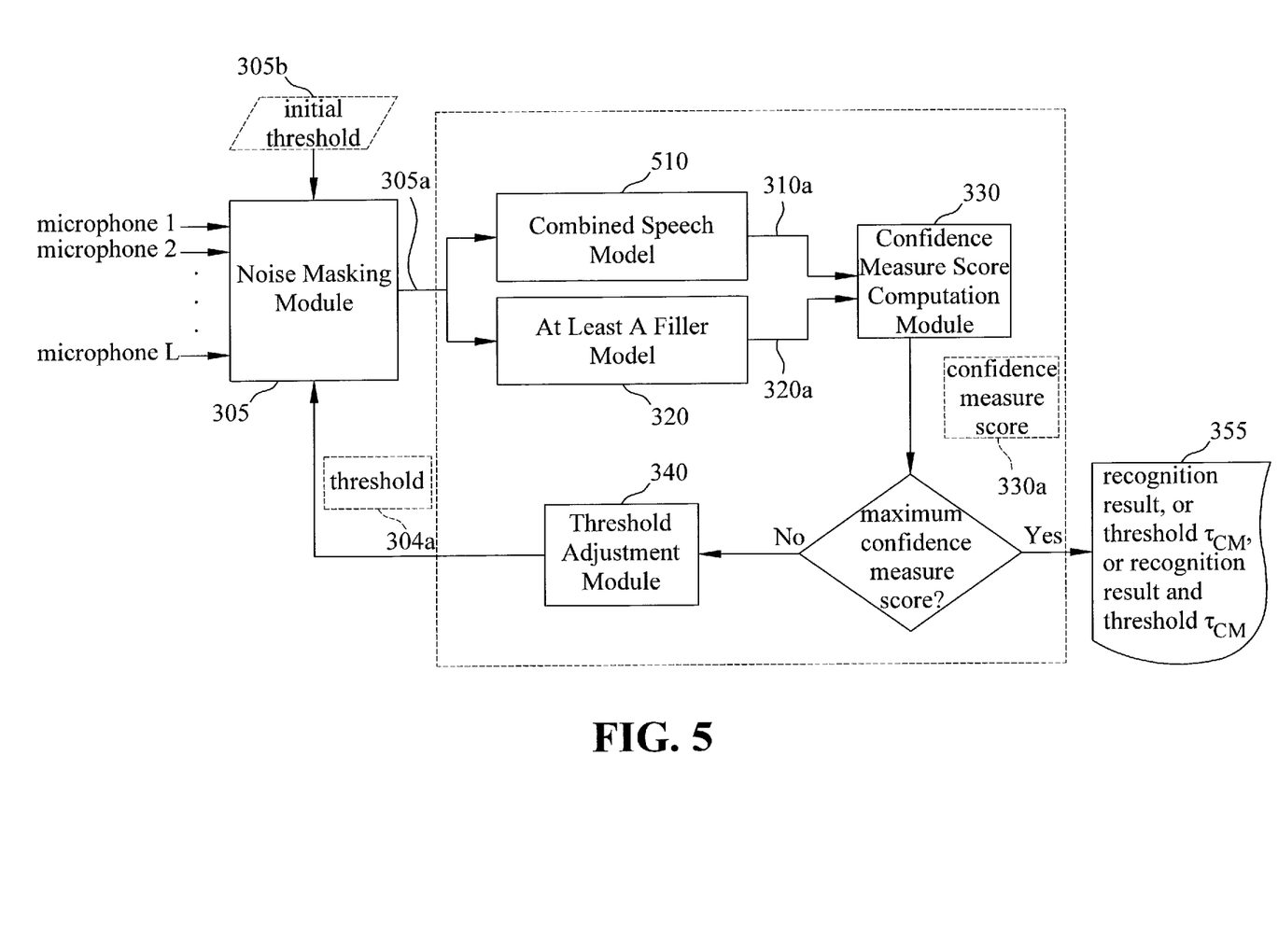
FIG. 5 is a block diagram illustrating another implementation of a function of scores obtained from each of the at least a speech model in FIG. 3, according to an exemplary embodiment.

Yet in another instance, as shown in FIG. 5, each model of speech model 1~speech model N may be merged into a combined speech model 510, then computes the score for the combined speech model 510, in other words, uses a combined model approach to increase robustness.

Figure 6:
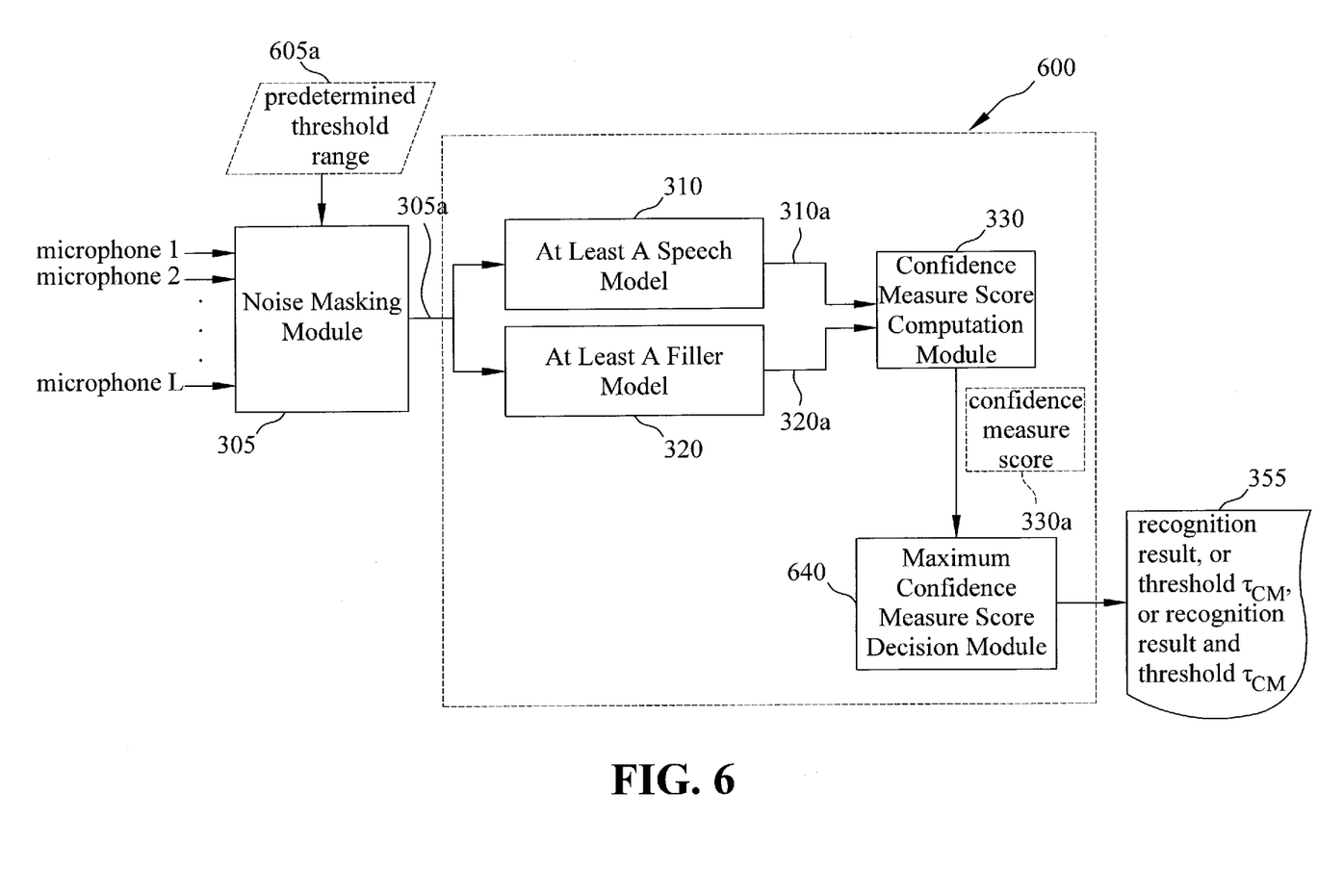
FIG. 6 is a block diagram of a microphone array-based speech recognition system, according to an exemplary embodiment.

As mentioned earlier, in another instance, it may use such as linear search method, to estimate the threshold $\tau_{CM}$ that maximizes the confidence measure score. Accordingly, FIG. 6 is a block diagram of another microphone array-based speech recognition system, according to an exemplary embodiment. As shown in FIG. 6, when the speech recognition system starts to operate, the threshold $\tau$ may be predetermined within a range, for example, $0.1 \leq T \leq 1.2$, and then a linear search method may be used with the threshold $\tau$ within the range to find the threshold that corresponds to the maximum confidence measure score. In such case, the microphone-array-based speech recognition system 600 in FIG. 6 may comprise at least a speech model 310, at least a filler model 320, the confidence measure score computation module 330, and a maximum confidence measure score decision module 640. The maximum confidence measure score decision module 640 may be implemented by using hardware description languages (such as Verilog or VHDL) for circuit design, doing integration and layout, and then programming to a field programmable gate array (FPGA).

As mentioned earlier, the circuit design with the hardware description language may be achieved in many ways. For example, the professional manufacturer of integrated circuits may realize implementation with application-specific integrated circuits (ASIC) or customer-design integrated circuits. In other words, the speech recognition system 600 may use at least an integrated circuit to implement at least a speech model 310, at least a filler model 320, the confidence measure score computation module 330, and the maximum confidence measure score decision module 640. The speech recognition system 600 may also use at least a processor to complete functional implementation of at least a speech model 310, at least a filler model 320, confidence measure score computation module 330, and maximum confidence measure score decision module 640.

For each given threshold $\tau$ within the predetermined threshold range 605*a*, the speech recognition system 600 may compute a corresponding confidence measure score 330*a* by using the confidence measure score computation module 330, according to the score information 310*a* for each of at least a speech model 310 and the score 320*a* for each of at least a filler model 320, and provide the computed confidence measure score 330*a* to the maximum score decision module 640. Then the maximum score decision module 640 may determine a maximum score and find the threshold $\tau_{CM}$ corresponding to the maximum confidence measure score. As mentioned earlier, the output 355 of speech recognition system 600 may be a recognition result, or the threshold $\tau_{CM}$ to maximize the confidence measure score, or the recognition result and the threshold $\tau_{CM}$.

The speech recognition system 600 of FIG. 6 computes a corresponding confidence measure score for each given threshold $\tau$ within a predetermined threshold range 605*a*. So that it does not need an algorithm or a threshold adjustment module to update the threshold. The speech recognition system 600 may provide each given threshold T to the noise masking module 305 sequentially, execute noise cancelling according to the threshold $\tau$ for the input speech of a microphone-array, i.e., the microphone 1, microphone 2, . . . , and microphone L, where L is an integer greater than 1, and then transmit a noise-cancelled speech signal 305*a* to at least a speech model 310 and at least a filler model 320 respectively. The maximum confidence measure score decision module 640 may determines a maximum confidence measure score from all confidence measure scores computed by confidence measure score computation module 330 and obtains a threshold $\tau_{CM}$ corresponding to the maximum confidence measure score. The speech recognition system 600 then outputs a speech recognition result related to the maximum confidence measure score. For example, label 355 as shown.

Figure 7:
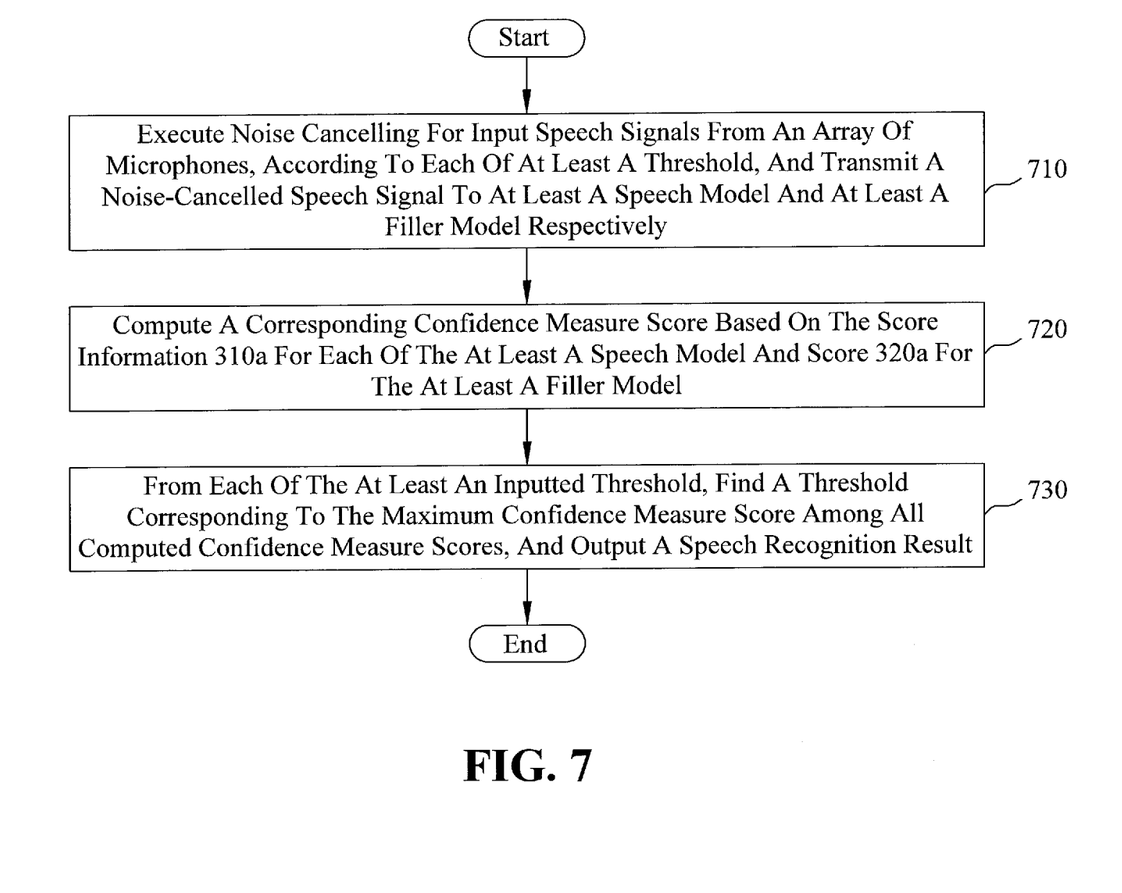
FIG. 7 is a flow chart illustrating the operation of a microphone array-based speech recognition method, according to an exemplary embodiment.

Accordingly, FIG. 7 is a flow chart illustrating the operation of a microphone array-based speech recognition method, according to an exemplary embodiment. The speech recognition method may be computer implemented, and may comprise the computer executable acts as shown in FIG. 7. In the step 710 of FIG. 7, it may execute noise cancelling for input speech signals from an array of microphones, according to each of at least a threshold, and transmit a noise-cancelled speech signal to at least a speech model and at least a filler model respectively. Then a corresponding confidence measure score is computed based on the score information 310*a* for each of the at least a speech model and score 320*a* for the at least a filler model, as shown in step 720. And, from each of the at least an inputted threshold, it may find a threshold $\tau_{CM}$ corresponding to the maximum confidence measure score among all computed confidence measure scores and outputs a speech recognition result, as shown in step 730.

Figure 8:
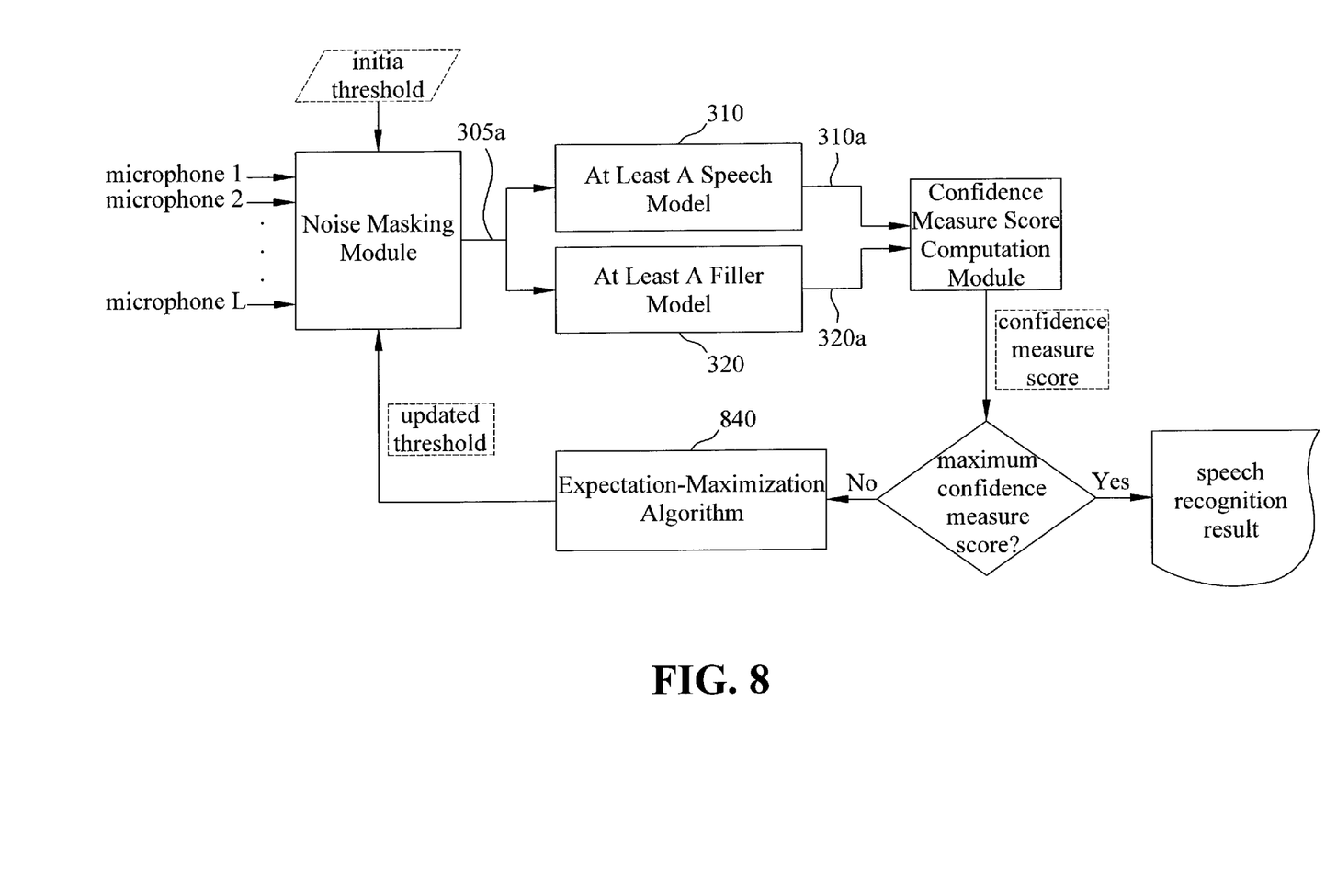
FIG. 8 is a block diagram illustrating the operation for updating the threshold and how to find a threshold corresponding to the maximum confidence measure score, according to an exemplary embodiment.

According to the mentioned exemplary embodiments from FIG. 3 to FIG. 6, the input parameters of noise cancelling, i.e., the at least an input threshold, may use a variety of ways to update the threshold. And, it may also use a variety of ways to find a threshold $\tau_{CM}$ corresponding to a maximum confidence measure score according to each of the at least an input threshold. FIG. 8 is a block diagram illustrating the operation for updating the threshold and how to find a threshold $\tau_{CM}$ corresponding to the maximum confidence measure score, according to an exemplary embodiment.

Referring to FIG. 8, there may be an initial threshold provided to perform a noise cancelling and transmit a noise-cancelled speech signal 305a to at least a speech model 310 and at least a filler model 320 respectively. Then it may execute confidence measure score computations and obtain a corresponding confidence measure score to determine whether this confidence measure score is the maximum confidence measure score. When the computed confidence measure score is the maximum confidence measure score, it indicates a threshold $\tau_{CM}$ corresponding to the maximum confidence measure score is found, and a speech recognition result may be generated.

When the computed confidence measure score is not the maximum confidence measure score, it may execute an expectation-maximization (EM) algorithm 840, and output an update threshold for noise cancelling. With the same way, a noise-cancelled speech signal is further outputted to at least a speech model and at least a filler model respectively, and the confidence measure score computation is performed, and so on. In the operation of FIG. 8, the score function for at least a speech model 310 may be designed by the same way as taking the maximum of the score Top1 for each speech model among speech model 1~speech model N, or taking the M highest scores of M speech models among speech model 1 to speech model N and giving each of these M scores different weights, or using a combined model approach to increase robustness.

Figure 9:
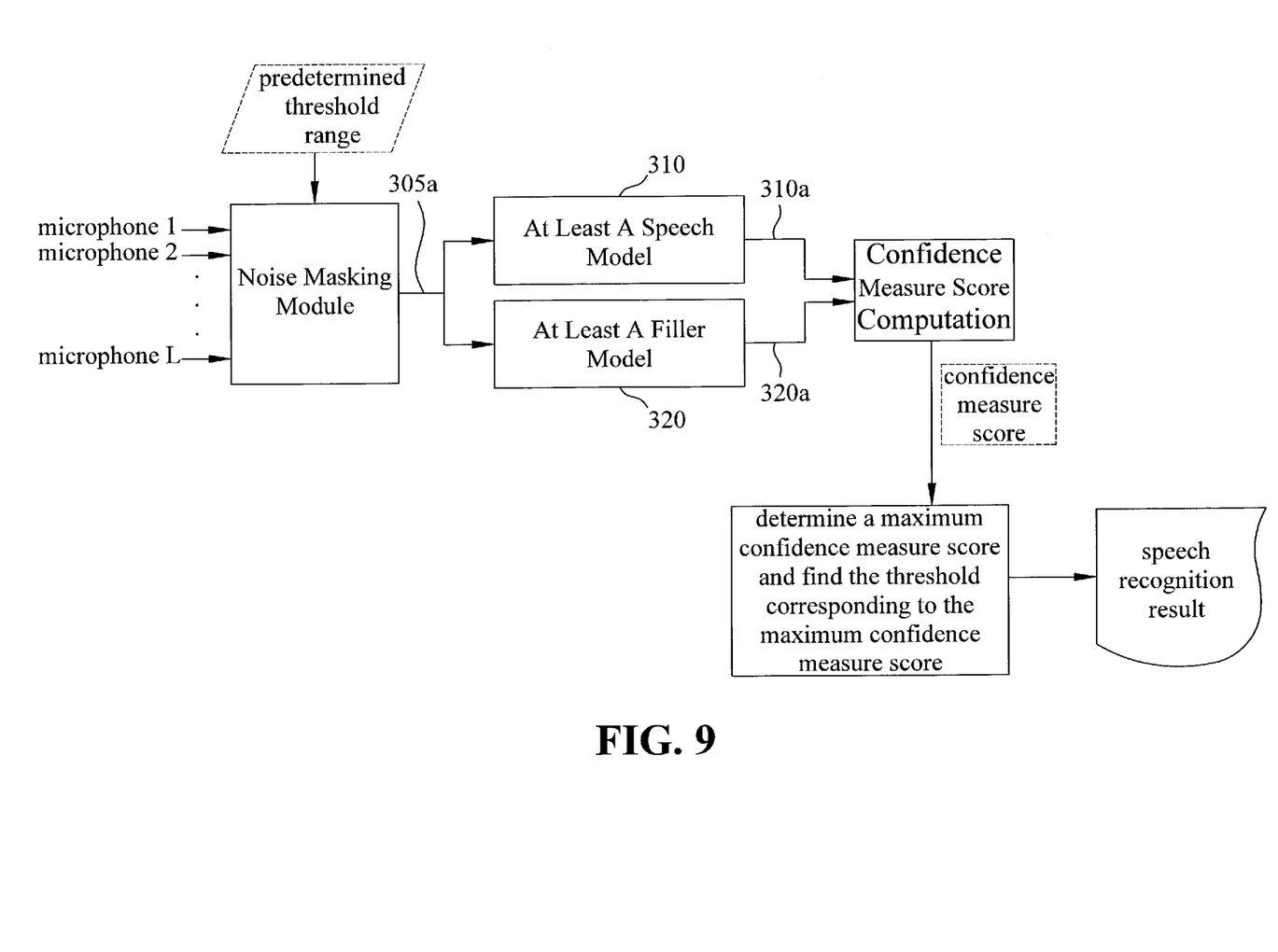
FIG. 9 is another block diagram illustrating the operation for updating the threshold and how to find a threshold corresponding to the maximum confidence measure score, according to an exemplary embodiment.

FIG. 9 is a block diagram illustrating another operation for updating the threshold and how to find a threshold corresponding to the maximum confidence measure score, according to an exemplary embodiment. The exemplar in FIG. 9 uses the linear search method mentioned above. The range of threshold is predetermined. At least a processor may be used to compute a corresponding confidence measure score according to the score information 310a for each of at least a speech model 310 and the score 320a for each of at least a filler model 320 for each given threshold $\tau$ within the predetermined threshold range, and then determine the maximum confidence measure score from all of the computed confidence measure scores and obtain the threshold corresponding to the maximum confidence measure score, and generate a speech recognition result.

The disclosed exemplary embodiments of the microphone-array-based speech recognition system and method may be applied to a noisy environment, for example, using the speech interface in the road often encounters outside noise or wind noise interference. This may lead to erroneous result of the voice command recognition. Because environment changes at any time, users may install the microphone array-based speech recognition system in the car, use the disclosed exemplary embodiments to find the most appropriate threshold for each voice command and optimize speech recognition results. For example, the user may use a way as push to talk to start voice command to be executed, and use existing speech activity detection technology to detect the end point of the user's voice command, and input this section of the voice command to the disclosed microphone-array-based speech recognition system to find an optimal threshold.

Figure 10:
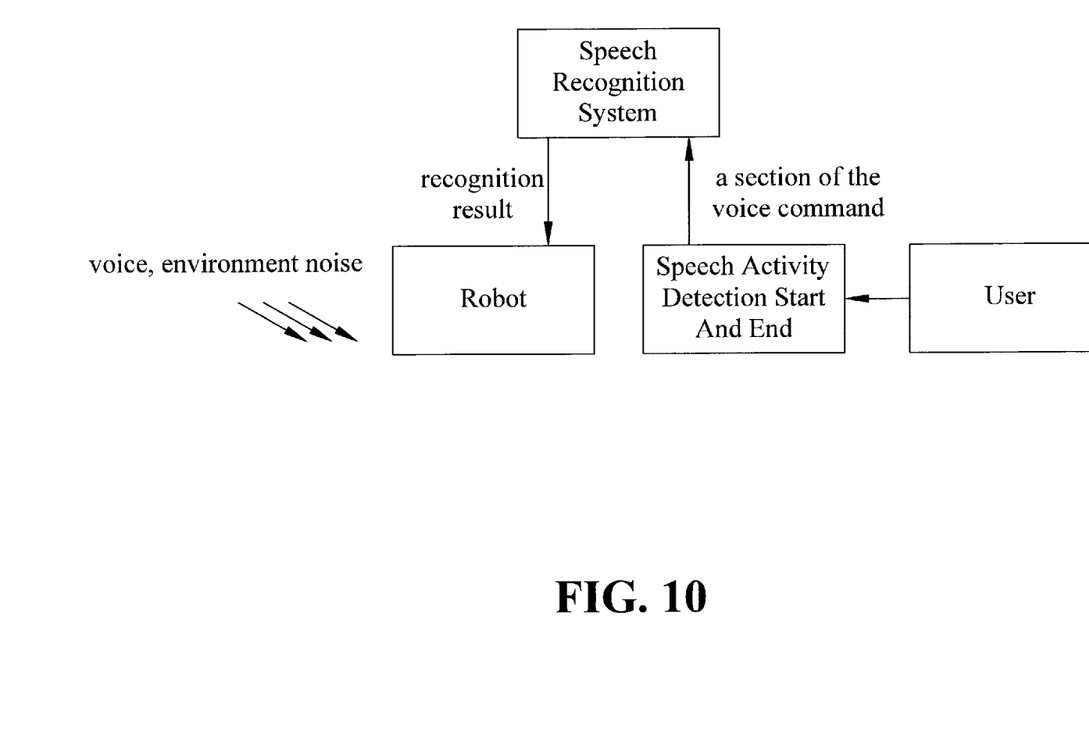
FIG. 10 illustrates a schematic diagram of the disclosed microphone-array-based speech recognition system applied to a real environment with noise interference, according to an exemplary embodiment.

The disclosed exemplary embodiment of the microphone-array-based speech recognition system and method may be applied to an interaction with the robot, such as the example shown in FIG. 10, the robot may use existing speech activity detection technology to detect start and end points of the user's voice command, and input this section of the voice command to the disclosed exemplary microphone-array-based speech recognition system to get the best recognition result.

Figure 11A:
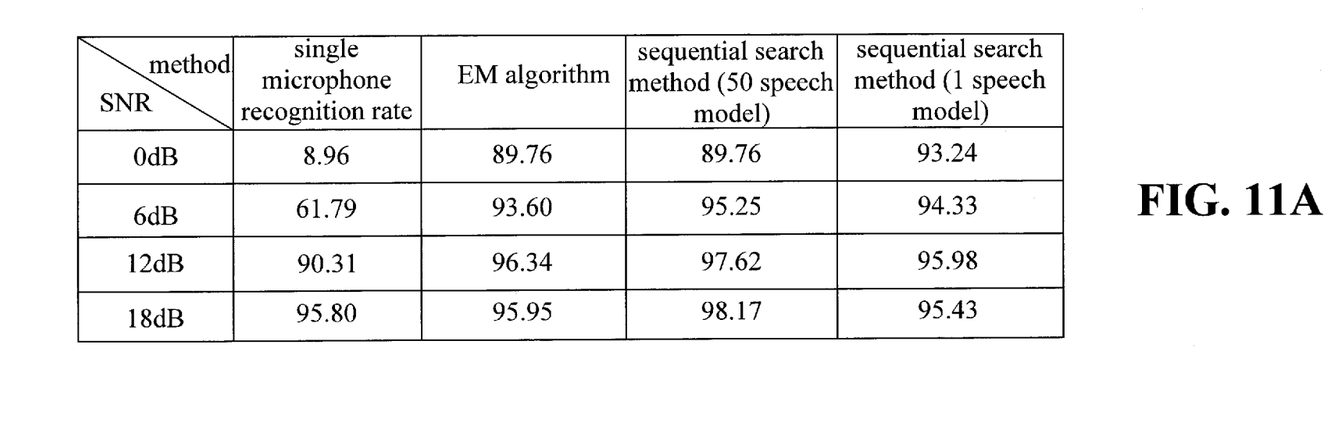
FIG. 11A and FIG. 11B show examples of experimental results of the speech recognition rate by using the disclosed microphone array-based speech recognition system with different signal-noise ratios for interference source at 30 degrees and 60 degrees, respectively, according to an exemplary embodiment.
Figure 11B:
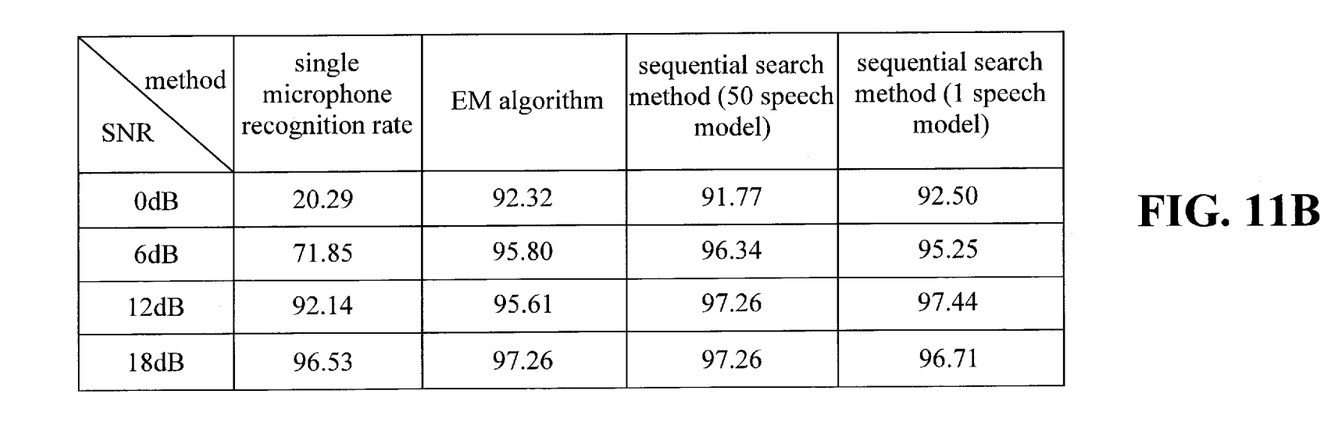

FIG. 11A and FIG. 11B show examples of experimental results of the speech recognition rate by using the disclosed microphone array-based speech recognition system with different signal-to-noise ratios for interference source at 30 degrees (FIG. 11A) and 60 degrees (FIG. 11B), respectively, according to an exemplary embodiment.

In the exemplars, a number of corpus recorded by the microphone-array in an anechoic room are used to test the speech recognition system. Experimental parameters are set as following: a microphone array with two microphones, the distance between two microphones is 5 cm, the distance between microphone and speaker as well as the source of the interference is 30 cm respectively, a total of 11 speakers participated in the recording, each one records 50 utterances for a car remote control task, a total of 547 effective utterances are obtained, the utterances then are mixed with noise at 30 degrees and 60 degrees respectively and form different signal-to-noise ratio (SNR) corpuses (0, 6, 12, 18 dB) for testing. Where linear search method and expectation-maximization (EM) algorithm are used respectively to estimate the threshold $\tau_{CM}$ corresponding to the maximum confidence measure score to get the speech recognition rate, and the threshold is updated once every test utterance.

Figure 12:
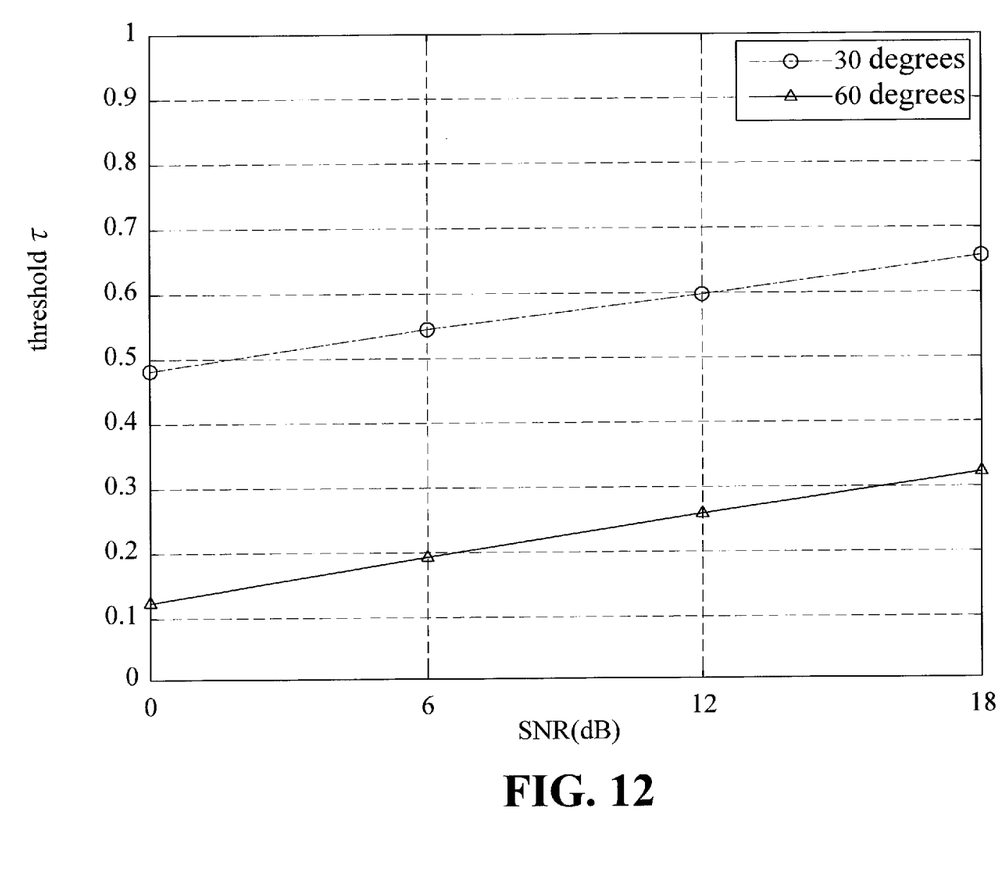
FIG. 12 shows a diagram illustrating the estimated threshold with the disclosed microphone-array-based speech recognition system may be used as a composite indicator of noise angle and signal to noise ratio, according to an exemplary embodiment.

In the above experimental results, the estimated threshold with the disclosed microphone array-based speech recognition system may be used as a composite indicator of noise angle and signal to noise ratio. This may be seen from FIG. 12. In the exemplar of FIG. 12, the horizontal coordinate represents signal to noise ratio, the vertical axis coordinate represents estimated average results of the thresholds, solid line represents the estimated average results of the threshold with source of interference at 60 degrees, and dashed line represents the estimated average results of the threshold with source of interference at 30 degrees.

In summary, the disclosed exemplary embodiments provide a microphone array based speech recognition system and method. It closely combines the anti-noise with a speech recognition device, to suppress spectrum of noise interference in speech feature vector by using maximization of the computed confidence measure score from at least a speech model and at least a filler model, thereby improving speech recognition rate. The disclosed exemplary embodiments do not require re-recording corpus and re-training speech models, and are able to adjust noise masking parameters with the noisy at different angles and different SNR, thus is useful for a real noisy environment to improve speech recognition rate, and may provide better speech interface and user experience for human-machine speech interaction.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A microphone-array-based speech recognition system, combining a noise masking module for cancelling noise of input speech signals from an array of microphones, according to an inputted threshold, and comprising:

at least a speech model and at least a filler model that receive respectively a noise-cancelled speech signal outputted by said noise masking module;

a confidence measure score computation module that computes a confidence measure score with said at least a speech model and said at least a filler model for said threshold and the noise-cancelled speech signal; and a threshold adjustment module that adjusts said threshold and provides said threshold to said noise masking module to continue the noise cancelling for achieving a maximum confidence measure score computed by said confidence measure score computation module, thereby outputting a speech recognition result related to said maximum confidence measure score.

2. The speech recognition system as claimed in claim 1, wherein said threshold adjustment module finds a threshold corresponding to said maximum confidence measure score by applying an expectation-maximization algorithm.

3. The speech recognition system as claimed in claim 1, said system compares the similarity of said noise-cancelled speech signal with each of said at least a speech model and obtains a score for each said speech model, and compares the similarity of said noise-cancelled speech signal with at least a filler model and obtains a score for said at least a filler model, and said confidence measure score computation module subtracts the score for said at least a filler model from a score function value for said at least a speech model, and takes the difference as said confidence measure score.

4. The speech recognition system as claimed in claim 2, wherein said at least a speech model includes N speech models, said threshold adjustment module takes the M highest scores of M speech models among said N speech models and then gives each of said M speech models different weights to find the threshold corresponding to said maximum confidence measure score, wherein N and M are all positive integers and M≤N.

5. The speech recognition system as claimed in claim 2, wherein said at least a speech model includes a plurality of speech models, and said threshold adjustment module takes a score of a combined speech model merged from each of said a plurality of speech models to find the threshold corresponding to said maximum confidence measure score.

6. The speech recognition system as claimed in claim 2, wherein said at least a speech model includes a plurality of speech models, and said threshold adjustment module takes the maximum score for each of said a plurality of speech models to find the threshold corresponding to said maximum confidence measure score.

7. The speech recognition system as claimed in claim 1, said speech recognition system further comprises at least a processor to complete functional implementation of said at least a speech model, said at least a filler model, said confidence measure score computation module, and said threshold adjustment module.

8. The speech recognition system as claimed in claim 1, wherein said at least a speech model, said at least a filler model, said confidence measure score computation module, and said threshold adjustment module are realized by at least an integrated circuits.

9. A microphone-array-based speech recognition system combining a noise masking module for cancelling noise of input speech signals from an array of microphones, according to each of a plurality of given thresholds within a predetermined range, and comprising:
at least a speech model and at least a filler model that receive respectively a noise-cancelled speech signals after said cancelling noise;
a confidence measure score computation module that computes a confidence measure score with said at least a speech model and said at least a filler model for each given threshold within said predetermined range and said noise-cancelled speech signals; and
a maximum confidence measure score decision module that determines a maximum confidence measure score from all confidence measure scores computed by said confidence measure score computation module and obtains a threshold corresponding to said maximum confidence measure score, and outputs corresponding speech recognition result.

10. The speech recognition system as claimed in claim 9, said speech recognition system further comprises at least a processor to complete functional implementation of said at least a speech model, said at least a filler model, said confidence measure score computation module, and said maximum confidence measure score decision module.

11. The speech recognition system as claimed in claim 9, wherein said at least a speech model, said at least a filler model, said confidence measure score computation module, and said maximum confidence measure score decision module are realized by at least an integrated circuits.

12. The speech recognition system as claimed in claim 9, said speech recognition system finds the threshold corresponding to said maximum confidence measure score by applying a linear search method.

13. A microphone-array-based speech recognition method implemented by a computer system, said method comprising following acts executed by said computer system:
executing noise cancelling of input speech signals from an array of microphones according to at least an inputted threshold, and transmitting a noise-cancelled speech signal to at least a speech model and at least a filler model respectively;
computing a corresponding confidence measure score based on score information for each of said at least a speech model and a score for said at least a filler model;
from each of said at least an inputted threshold, finding a threshold corresponding to a maximum confidence measure score among all computed confidence measure scores, and generating speech recognition result.

14. The speech recognition method as claimed in claim 13, said finds the threshold corresponding to said maximum confidence measure score by applying an expectation-maximization algorithm.

15. The speech recognition method as claimed in claim 13, said method finds the threshold corresponding to said maximum confidence measure score by applying a linear search scheme.

16. The speech recognition method as claimed in claim 13, said method substrates said score for said at least a filler model from each score function value for said at least a speech model for each of said at least an inputted threshold, and takes obtained difference as each corresponding confidence measure score.

17. The speech recognition method as claimed in claim 14, said method combines said at least a speech model into a combined model to increase robustness.

18. The speech recognition method as claimed in claim 14, wherein said at least a speech model includes N speech models, and said method takes M highest scores of M speech models among said N speech models and then gives each of said M speech models different weights to find the threshold corresponding to said maximum confidence measure score, wherein N and M are all positive integers and M≤N.

19. The speech recognition method as claimed in claim 14, wherein said at least a speech model comprises a plurality of speech models, and said method takes the maximum confidence measure score for each of said a plurality of speech models as a score function value for said at least a speech model.

20. The speech recognition method as claimed in claim 15, said method combines said at least a speech model into a combined model to increase robustness.

* * * * *